United States Patent [19]

Eckel et al.

[11] Patent Number: 5,747,393

[45] Date of Patent: May 5, 1998

[54] TEXTILE FABRIC FOR SEAT COVERS OR CUSHIONS, IN PARTICULAR FOR SEATS IN MOTOR VEHICLES

[75] Inventors: Petra Eckel, Neuwied; Edgar Pelz, Esslingen; Bernd Potzler, Marktbreit, all of Germany

[73] Assignee: Lohmann GmbH & Co. KG, Neuwied, Germany

[21] Appl. No.: 682,634

[22] PCT Filed: Jan. 5, 1995

[86] PCT No.: PCT/EP95/00030

§ 371 Date: Sep. 16, 1996

§ 102(e) Date: Sep. 16, 1996

[87] PCT Pub. No.: WO95/19882

PCT Pub. Date: Jul. 27, 1995

[30] Foreign Application Priority Data

Jan. 24, 1994 [DE] Germany ............... 94 01 121 U

[51] Int. Cl.$^6$ ............................................. B32B 5/02

[52] U.S. Cl. ............... 442/272; 442/247; 442/318; 442/319

[58] Field of Search ............... 442/225, 227, 442/238, 247, 272, 318, 319

[56] References Cited

FOREIGN PATENT DOCUMENTS 2 138 745   10/1984   United Kingdom .

OTHER PUBLICATIONS

KMITTA, "Textilien im Automobil", 14th–15th Oct., 1992, pp. 88–105.

Technische Textilien, Jul./Aug. 1993 pp. T172–174.

*Primary Examiner*—Christopher Raimund
*Attorney, Agent, or Firm*—Wenderoth, Lind & Ponack

[57] ABSTRACT

A textile article for seat covers or cushions, in particular for seats in motor vehicles, which is designed for achieving a climatizing effect. The fabric is composed of several plies in a sandwich-like arrangement:

a) a woven or knitted fabric (1) facing towards the body, and which has moisture-transporting and moisture distributing properties, b) a needle-punched non-woven fabric (2) located thereunder, also having moisture-transporting and moisture distributing properties, c) a second needle-punched non-woven fabric (3) located thereunder, having absorbent and storing properties; and d) a thermobonded non-woven fabric (4) located thereunder, having cushioning and rear-ventilating properties.

14 Claims, 1 Drawing Sheet

TEXTILE FABRIC FOR SEAT COVERS OR CUSHIONS, IN PARTICULAR FOR SEATS IN MOTOR VEHICLES

SPECIFICATION

The invention relates to a textile fabric for seat covers or cushions, in particular for seats in motor vehicles, which is especially designed for achieving a climatizing effect.

By a climatizing effect for seat covers or cushions in motor vehicles it is understood that these are to have—apart from a comparatively high air permeability—thermal conductivity for conducting the body heat away from the body, capillary action for transmitting moisture, and rear-ventilating property.

BACKGROUND OF THE INVENTIONS

Cushioning materials for motor vehicle seats are being utilized in the art with various material compositions, designs and constructions. The least expensive and therefore most frequently employed materials are polyurethane foams of various densities. Besides these, in vehicles in the upper price range, constructions of polyurethane foam and rubberized hair, as well as mixtures of polyester fibres and animal fibres (wool) in conjunction with polyurethane foam are utilized. A further possibility is the use of wadding mats of polyester/copolyester thermobonded nonwoven as padding material (VDI congress "Textilien im Automobil", 14th–15th Oct. 1992, pages 88 ff).

A technical variant is a seat construction with rear ventilation and additional Gore-tex® membrane (Technische Textilien, Jul./Aug. 1993, p. T172).

Disadvantages of the heretofore employed seat designs lie in the fact that neither polyurethane foams nor rubberized hair have the thermal conductivity required for conducting the body heat away from the body, even under the most favourable conditions such as the body being at rest and an ambient temperature of 20° C. In addition, the mentioned materials impede the transmission of moisture as a result of their low capillary action. The manufacture of superior material compositions or seat constructions is more complicated and they are in addition more difficult to recycle. Recycling, in particular, is of great importance at present as disposal capacities are decreasing while costs are rising.

Seating materials of polyester/copolyester thermobonded nonwoven have the advantage of a high air permeability, but they also have the great drawback of being complicated to manufacture. In their manufacture wadding mats are placed in various plies one upon the other, offset by 90 degrees, and are pressed, in order to achieve high restoring forces.

DESCRIPTION OF THE INVENTION

It is the object of the present invention to provide a textile fabric for seat covers or cushions, in particular for seats in motor vehicles, which is especially designed for achieving a climatizing effect while at the same time being easy to manufacture and effective in use, as well as being reprocessable by means of unbroblematic disposal due to its suitability for recycling, and which, apart from its high air permeability, has sufficient thermal conductivity for conducting body heat away from the body, as well as a satisfactory capillary action for moisture transport, and enables an economically efficient manufacture.

In a textile fabric of the kind mentioned hereinabove this object is achieved by the invention in that the said textile fabric is made up of several plies of textile fabrics in sandwich-like arrangement and comprises the following plies:

a) a first ply facing towards the body, and which has moisture-transporting and moisture distributing properties, respectively;

b) a second ply located thereunder, likewise having moisture-transporting and moisture distributing properties, respectively;

c) a third ply located thereunder, having absorbent and storing properties;

d) a fourth ply located thereunder, having cushioning and rear-ventilating properties.

One embodiment provides for the textile fabric to have an additional, fifth layer right at the bottom which has a stabilizing property.

Further advantageous properties are provided for according to the disclosed features of the invention.

In this connection, the first ply may be a woven or knitted fabric of synthetic staple fibres or filaments. This is preferably a polyester knitted fabric.

The second ply is a needle-punched nonwoven of synthetic staple fibres, preferably of polyester needle-punched nonwoven.

The third ply may be a needle-punched nonwoven fabric of synthetic and/or natural staple fibres. Preferably, this is a viscose rayon needle-punched nonwoven.

The fourth ply is a thermobonded nonwoven of synthetic staple fibres, preferably of polyester/copolyester.

The fifth ply may be a knitted fabric, woven fabric or nonwoven, and is preferably a polyester spunbonded nonwoven. According to the invention, the above-mentioned plies of the textile fabric are secured to each other by frictional closure and form closure, cohesively and/or adhesively, and preferably delaminatably.

Furthermore it is provided that the first ply and the fifth ply are to be laminated onto the intermediate plies 2 to 4 by means of a paste, a powder, a hotmelt and/or an adhesive nonwoven, preferably of copolyester, employing an appropriate method (e.g. a flat bed laminating unit, etc.). The second ply and the third ply are mechanically bonded to each other, preferably by one-sided needling. The fourth, polyester/copolyester ply, consisting of a thermobonded nonwoven, is secured to the viscose rayon needle-punched nonwoven of the third layer, with the same direction of needling.

By the structure of the textile fabric according to the present invention it is achieved that the first ply, facing the body, and the second ply of the textile fabrics are provided with a moisture transmitting and moisture distributing function, respectively, and the third ply with absorbent and accumulating functions, and the fourth ply with a cushioning and rear-ventilating function. The sandwich-like fabric may additionally be stabilized by a fifth ply, whereby it is of advantage that the material is delaminatable due to the composite of plies according to the invention, and can thereby be recyled without problems.

BRIEF DESCRIPTION OF DRAWING

An example of an embodiment of the invention is shown, purely diagrammatically, in the accompanying drawing.

The multi-layered, sandwich-like fabric consists of a polyester needle-punched nonwoven 2 and a viscose rayon needle-punched nonwoven 3 which are mechanically joined to each other by one-sided needling. A thermobonded nonwoven fabric of polyester/copolyester 4 is bonded, with the same direction of needle-punch, to the viscose rayon needle-punched nonwoven 3 as a result of a further process step. A polyester knitted fabric 1 and a polyester nonwoven 5 are laminated on the upper face 2 and lower face 4 of the intermediate plies 2 and 4 by appropriate media and methods. The manufacture of the fabric consisting of plies 1 to 5, which according to the invention is multi-layered, presents no problems and is therefore comparatively inexpensive.

Figure 1:
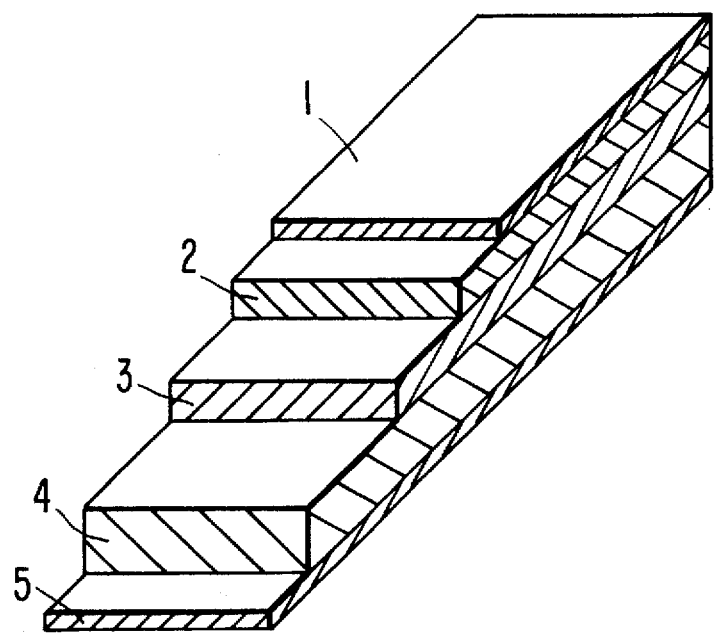

The construction of the vehicle (slightly inclined windshield, rear and side windows) results in a higher temperature which is compensated by an increased perspiration of the occupants of the vehicle, in particular of babies and infants. It is to great advantage in this respect that the capillary action of the fibre material is increased by the way it is manufactured, whereby moisture transport is improved, thus adapting the seat climate to the increased demands. As a result of the above-mentioned selection of raw materials and of the method of manufacture it is now possible to carry out an environmentally acceptable disposal and recycling by delaminating the individual plies, which are bonded to each other. Thus, the invention ideally solves the task mentioned hereinabove.

We claim:

1. A textile fabric for seat covers or cushions, in particular for seats in motor vehicles, particularly designed for achieving a climatizing effect, characterized in that it is composed of several plies of textile fabrics in a sandwich-like arrangement and comprises the following plies:

a) a first ply (1) facing towards the body and which has moisture-transporting and moisture distributing properties, respectively, and which consists of a woven or knitted fabric of synthetic staple fibres or filaments;

b) a ply (2) located thereunder, likewise having moisture-transporting and moisture distributing properties, respectively, and which consists of a needle-punched nonwoven of synthetic staple fibers, c) a third ply (3) located thereunder, having absorbent and storing properties, and which consists of a needle-punched nonwoven fabric of synthetic and/or natural staple fibers; and d) a fourth ply (4) located thereunder, having cushioning and rear-ventilating properties, and which consists of a thermobonded nonwoven of synthetic staple fibers.

2. A fabric according to claim 1, comprising an additional fifth ply (5) at the bottom, having a stabilizing property and consisting of a knitted fabric.

3. A fabric according to claim 1, wherein the first ply is a polyester knitted fabric.

4. A fabric according to claim 1, wherein the second ply is a polyester needle-punched nonwoven.

5. A fabric according to claim 1, wherein the third ply is a viscose rayon needle-punched nonwoven.

6. A fabric according to claim 1, wherein the fourth ply consists of polyester/copolyester.

7. A fabric according to claim 1, comprising an additional fifth ply (5) at the bottom, having a stabilizing property and consisting of a polyester spunbonded nonwoven fabric.

8. A fabric according to claim 1, wherein the plies (1) to (4) are bonded to each other by frictional and form closure, cohesively and/or adhesively.

9. A fabric according to claim 8, wherein the plies are bonded to each other delaminatably.

10. A fabric according to claim 2, wherein the plies (1) to (5) are bonded to each other by frictional and form closure, cohesively and/or adhesively.

11. A fabric according to claim 10 wherein the plies are bonded to each other delaminatably.

12. A fabric according to claim 10, wherein the first ply (1) and the fifth ply (5) are laminated onto the intermediate plies (2) to (4) by paste dot coating in a flat bed laminating unit.

13. A fabric according to claim 10, wherein the second ply (2) and the third ply (3) are bonded to each other by one-sided needle-punching.

14. A fabric according to claim 10, wherein the third ply (3) is mechanically bonded to the needle punched nonwoven of the fourth ply (4), with the same direction of needling.

* * * * *